(12) United States Patent
Krobath et al.

(10) Patent No.: US 10,781,747 B2
(45) Date of Patent: Sep. 22, 2020

(54) RECIPROCATING-PISTON MACHINE

(71) Applicant: AVL LIST GMBH, Graz (AT)

(72) Inventors: Andreas Krobath, St. Josef in der Weststeiermark (AT); Devaraj Doraiswamy, Graz (AT); Bernhard Hausmann, Kaindorf (AT); Thomas Weberbauer, Graz (AT); Jürgen Pichler, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 16/306,396

(22) PCT Filed: May 31, 2017

(86) PCT No.: PCT/AT2017/060144
§ 371 (c)(1),
(2) Date: Dec. 7, 2018

(87) PCT Pub. No.: WO2017/205889
PCT Pub. Date: Dec. 7, 2017

(65) Prior Publication Data
US 2019/0264607 A1    Aug. 29, 2019

(30) Foreign Application Priority Data

May 31, 2016   (AT) .............................. A 50490/2016
Jul. 6, 2016   (AT) .............................. A 50600/2016

(51) Int. Cl.
*F02B 75/04*   (2006.01)
*F02B 23/02*   (2006.01)
*F16C 7/06*    (2006.01)

(52) U.S. Cl.
CPC ............ *F02B 75/045* (2013.01); *F02B 23/02* (2013.01); *F16C 7/06* (2013.01)

(58) Field of Classification Search
CPC ................................ F02B 75/045; F02C 7/06
(Continued)

(56) References Cited

U.S. PATENT DOCUMENTS 2,989,954 A * 6/1961 Hulbert .................. F02B 75/04
                                                  123/48 B
5,960,750 A * 10/1999 Kreuter ................. F02B 75/045
                                                  123/48 B
(Continued)

FOREIGN PATENT DOCUMENTS

DE    102016213032 A1 *  1/2018 ............ F02B 75/045

*Primary Examiner* — Patrick Cicchino
(74) *Attorney, Agent, or Firm* — Dykema Gossett PLLC

(57) ABSTRACT

A reciprocating-piston machine, in particular an internal combustion engine with a variable compression ratio, having a length adjustment device arranged in a connecting rod and can be activated by way of a switching unit arranged in the connecting rod, wherein an actuating mechanism is operatively connected to the switching unit in the region of a connecting rod bearing in order to introduce a switching pulse into the connecting rod. The actuating mechanism has a transmission means arranged in the region of the connecting rod bearing, and the switching unit has at least one switching valve which is arranged in the connecting rod body of the connecting rod and the valve body, which can be displaced substantially in the direction of the rotational axis of the connecting rod bearing, and can be deflected out of a dosed position into an open position by way of the transmission means.

21 Claims, 6 Drawing Sheets

(58) Field of Classification Search
USPC .......................................................... 123/48 B
See application file for complete search history.

(56) References Cited

U.S. PATENT DOCUMENTS

| | | | |
|---|---|---|---|
| 7,469,663 B1* | 12/2008 | Berger | F02B 75/045 |
| | | | 123/48 B |
| 7,685,974 B2* | 3/2010 | Berger | F02B 75/045 |
| | | | 123/48 B |
| 8,851,030 B2* | 10/2014 | von Mayenburg | F16C 23/10 |
| | | | 123/48 B |
| 9,958,004 B2* | 5/2018 | Ezaki | F02B 75/045 |
| 10,119,462 B2* | 11/2018 | Ezaki | F02D 15/02 |
| 10,294,859 B2* | 5/2019 | Melde-Tuczai | F02B 75/045 |
| 2007/0175422 A1 | 8/2007 | Takahashi | |
| 2015/0152794 A1 | 6/2015 | Paul | |
| 2018/0051625 A1* | 2/2018 | Jung | F02B 75/045 |

\* cited by examiner

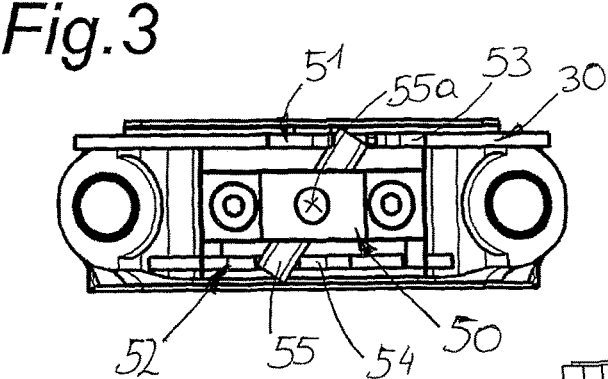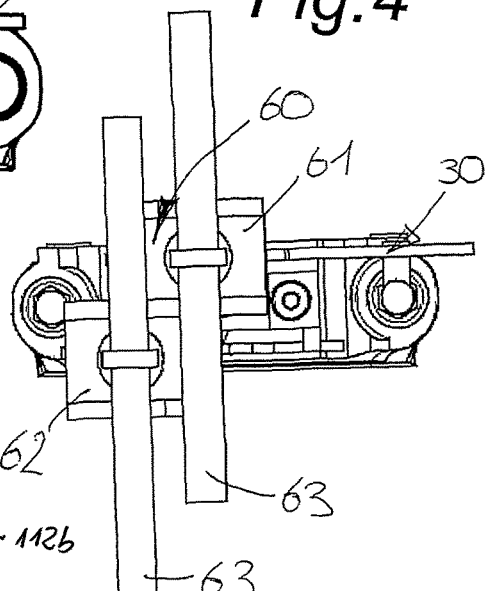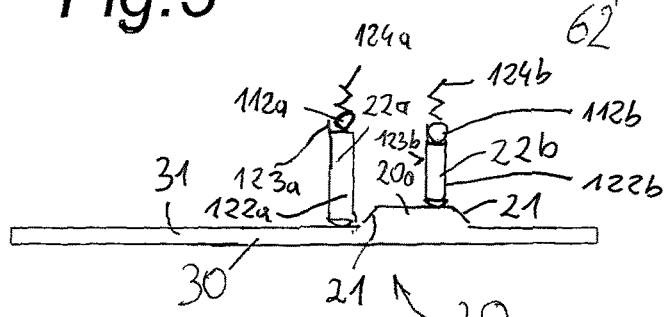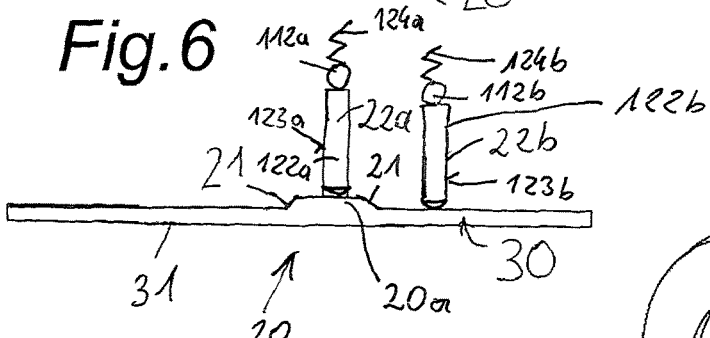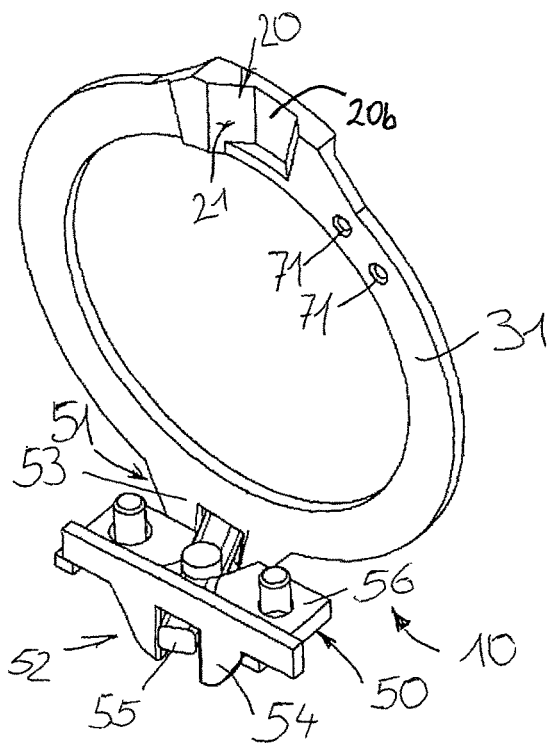

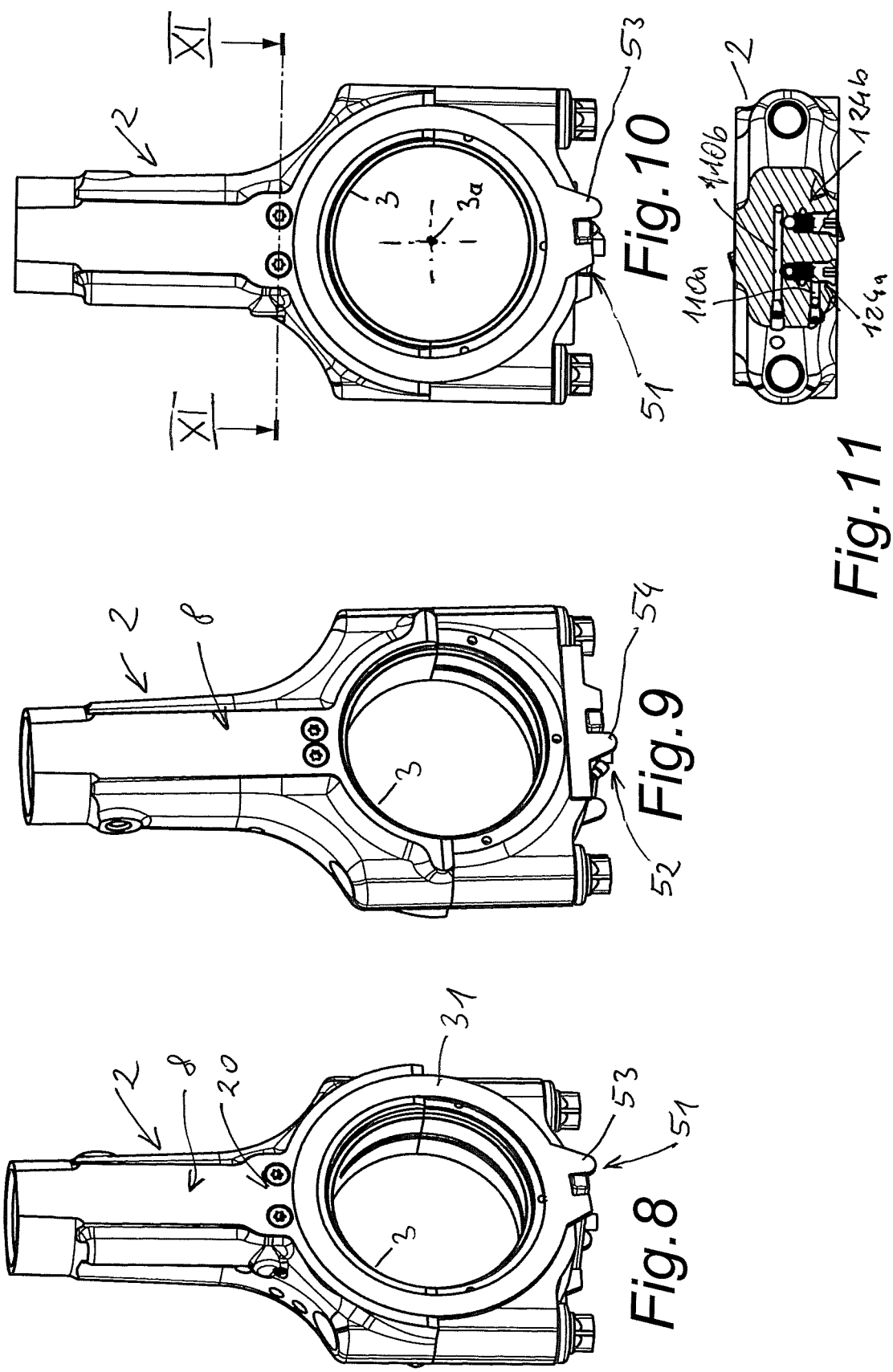

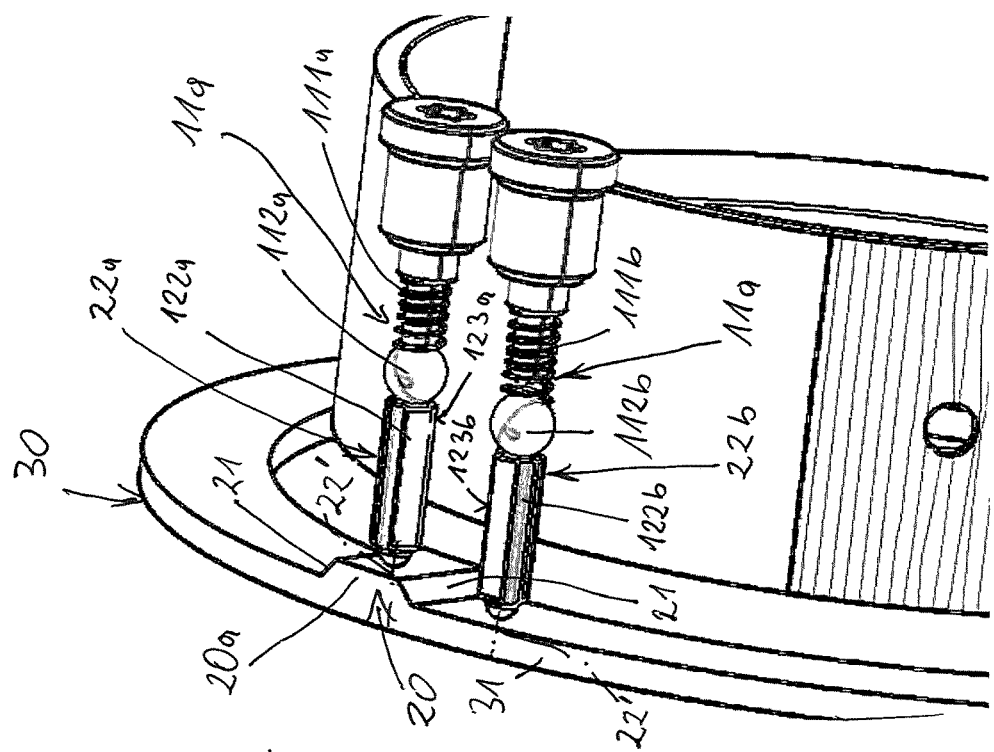
Fig. 15
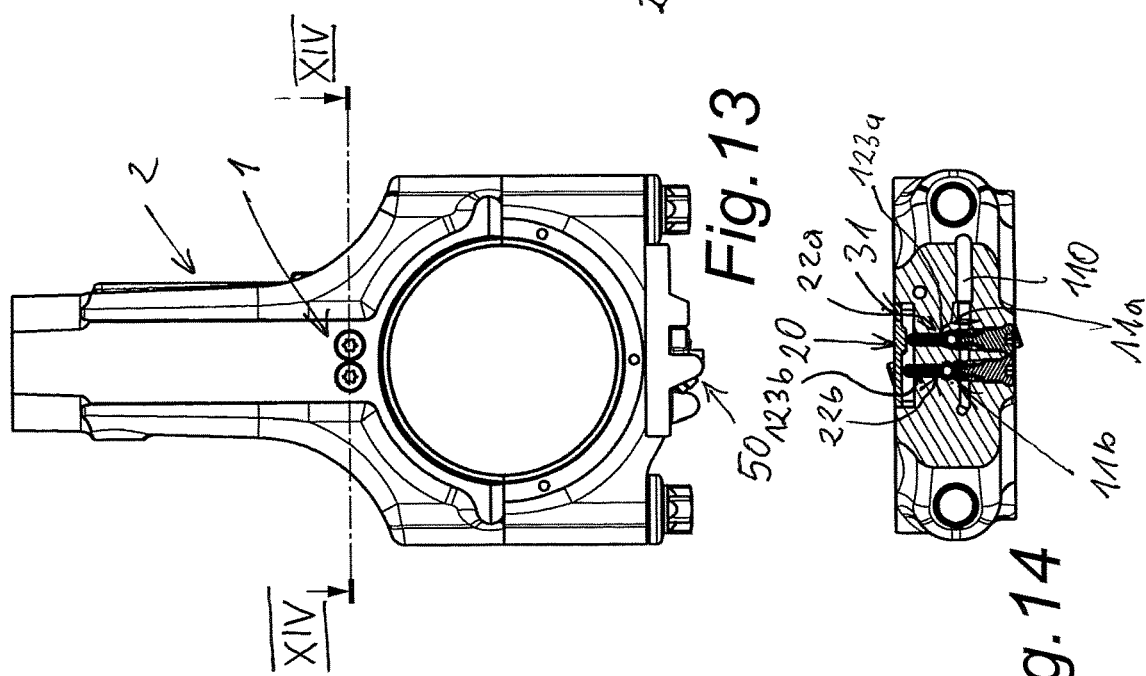
Fig. 13
Fig. 14
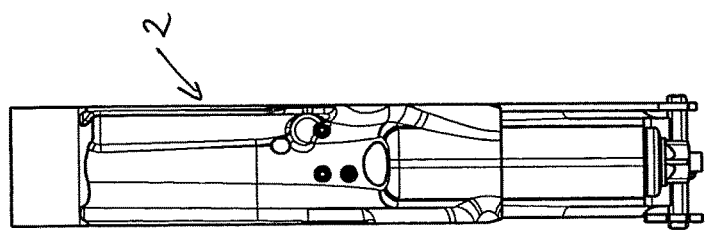
Fig. 12

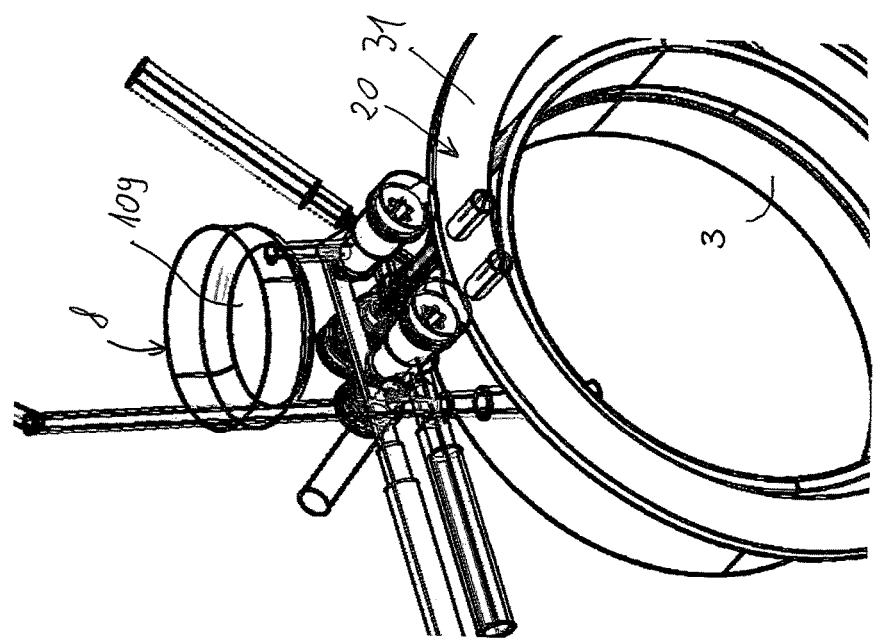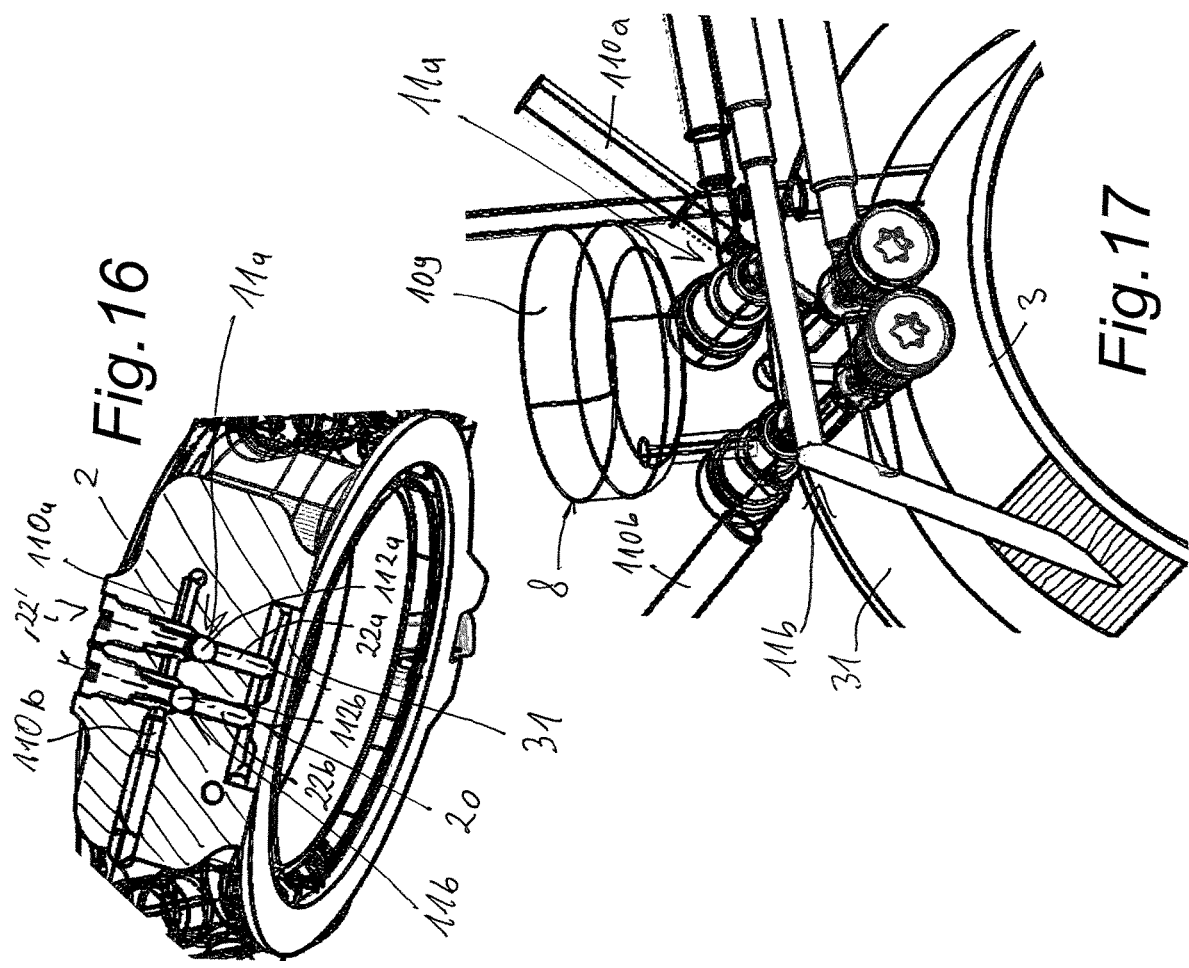

RECIPROCATING-PISTON MACHINE

The invention relates to a reciprocating-piston machine—in particular an internal combustion engine—having a variable compression ratio with a length adjusting device which is arranged in a connecting rod and which can be activated by a switching unit arranged in the connecting rod, wherein an actuating mechanism is operatively connected to the switching unit in the region of a connecting rod bearing in order to introduce a switching pulse into the connecting rod.

Internal combustion engines with variable compression ratios are used, for example, to increase the efficiency of internal combustion engines in operating ranges which deviate from the optimum.

Reciprocating-piston machines usually have a connecting rod that can be pivoted in a connecting rod bearing around a crankpin of the crankshaft. A piston pin bearing is provided at the end of the connecting rod remote from the connecting rod bearing. The connecting rod is pivotably connected to a piston via a piston pin arranged in the piston pin bearing. The piston moves back and forth in a cylinder between its top dead center and its bottom dead center.

Length adjusting devices can be designed mechanically, for example via threaded spindles and spindle nuts, or also hydraulically, via hydraulic chambers in the connecting rod, which can be filled with hydraulic medium via hydraulic lines from the connecting rod bearing.

A switching unit is any device which can switch the length adjusting device from holding its position to extending or shortening the connecting rod.

The switching pulse here is the pulse coming from outside the connecting rod to switch the length adjusting device.

An actuating mechanism is required to move the switching unit to the desired position.

An operative connection is understood here as a connection for the transmission of forces and displacements.

From DE 10 2013 113432 A1, a switching valve unit is known which has an actuation module with a linearly displaceable pick-up element for actuation from the outside onto the connecting rod. In this case, the actuation module is arranged in the connecting rod in the area of the connecting rod bearing in the direction of the piston pin bearing. The pick-up element in the embodiments shown can be moved parallel to one plane. This plane is defined by the rotational axes of the piston pin bearing and the connecting rod bearing. By shifting the pick-up element, hydraulic paths are released and blocked by two valves which are shifted due to ramps of the pick-up element.

It is not exactly disclosed how the displacement of the pick-up element occurs. In the area in which it is arranged the introduction of a switching pulse is difficult. An actuating mechanism is missing which actuates the pick-up element from an easily accessible position.

It is the object of the present invention to avoid these disadvantages and to specify a reciprocating-piston machine with a robust and simple actuating mechanism for introducing a switching pulse.

This object is achieved in accordance with the invention in that the actuating mechanism has a transmission means arranged in the region of the connecting rod bearing and the switching unit has at least one switching valve arranged in the connecting rod body of the connecting rod, whose valve body, which is displaceable essentially in the direction of the rotational axis of the connecting rod bearing, can be deflected by the transmission means from a first position—for example a closed position of the switching valve—into a second position—for example into an open position of the switching valve.

The transmission means is operatively connected to the deflection element and is arranged in the area of the connecting rod bearing. The transmission means is used here to transmit forces and displacements from the deflection element to the switching unit. This gives rise to the advantage that the distance between switching unit and deflection element can be overcome and the switching unit and deflection element do not necessarily have to be arranged next to each other.

The actuating mechanism preferably has a deflection element with at least one first force-application region and at least one second force-application region. The first force-application region and the second force-application region can be selectively contacted with at least one actuating device. This deflection element makes it possible to adjust the actuating mechanism only by the pivoting movement of the connecting rod.

Due to the deflection element, no complicated actuating device is necessary. Instead, a switching pulse can be introduced from the outside into the length adjusting device with the actuating device only by the own movement of the connecting rod.

The deflection element is particularly easy to implement if it has a deflection lever.

Easy accessibility or reachability of the deflection element is achieved when the deflection element is arranged on a connecting rod bearing bracket and can preferably be contacted with the actuating device near a lower dead center of the connecting rod. The same advantage results when the actuating device is located in a crankcase.

Here, the connecting rod has a connecting rod bearing bracket facing away from the piston and a connecting rod body facing the piston.

In order to obtain the simplest possible embodiment, it is advantageous if the transmission means on one side of the connecting rod facing away from the connecting rod bearing bracket has a pick-up unit for actuating the switching unit for the length adjusting device and the pick-up unit has a ramp and a thrust element displaceable through the ramp.

It is advantageous if the deflection element has at least one first driver which is connected to the transmission means and which is preferably fork-shaped when the first driver is in engagement with the deflection lever, and if the deflection element has at least one second driver which is preferably fork-shaped. The fork shape is designed in order to be able to grip the deflection lever from two sides as far as possible. Therefore the deflection lever is arranged between the fork arms and both fork arms act on the deflection lever. In this way a displacement in both directions can be transferred from the driver to the deflection lever and vice versa. The second driver is engaged with the deflection lever on the side of the deflection element facing away from the first driver.

A particularly simple embodiment with few individual parts is obtained if the transmission means is designed as a ring slide and the ring slide serves to transmit the switching pulse from the connecting rod bearing bracket to the connecting rod body. The ring slide is a ring-shaped disc that rotates around the connecting rod bearing and can be moved by the deflection element.

In order to switch a hydraulically operated length adjusting device as easily as possible, it is advantageous if the switching unit has a first switching valve with a first valve body and a second switching valve with a second valve body, wherein preferably the first and second valve bodies are deflectable alternately by the ramp.

For locking or releasing mechanical length adjusting devices, it is advantageous if the switching unit is designed as a displaceable wedge element.

The wedge element is used, for example, to mechanically block the rotation of threaded spindles that realize the extension or shortening of the connecting rod.

In order to obtain an embodiment having a rapidly deployable actuation from the first force-application region and the second force-application region, it is advantageous if the actuating means comprises a first actuating element and a second actuating element, wherein the first force-application region is selectively contactable with the first actuating element and the second force-application region is selectively contactable with the second actuating element. This means that the actuating elements can be moved independently of each other and the force-application regions can be contacted more quickly. It is particularly advantageous if the actuating element is arranged linearly displaceable or rotatable on shafts.

In order to make the contact between the actuating elements and the force-application regions as good as possible, it is advantageous if the first actuating element and the second actuating element each have a sliding surface for contacting the first force-application region and the second force-application region.

The sliding surface can preferably be arranged concave on the actuating element in order to allow gentle engagement.

To secure a position, it is advantageous if the actuating mechanism has a latching element which is arranged in such a way that a force acts on the transmission means against displacement.

A latching element is a ball with a spring and a counter surface on transmission means transversely to the displacement normal to the plane in which the transmission means is arranged.

In the following, the invention is described in more detail using the non-restrictive figures in several embodiment examples, wherein:

FIG. 3 shows this connecting rod in a view from below;

FIG. 4 shows this connecting rod with an actuating device in a view from below;

FIG. 5 shows a pick-up unit of this connecting rod in a first position in a plan view;

FIG. 6 shows this pick-up unit of the connecting rod in a second position in a plan view;

FIG. 7 shows an actuating mechanism of the connecting rod in an oblique view;

FIG. 8 shows a connecting rod of a reciprocating-piston machine according to the invention in a second embodiment in an oblique view;

FIG. 9 shows this connecting rod in further oblique view;

FIG. 10 shows this connecting rod in side view;

FIG. 11 shows this connecting rod in a section according to the line XI-XI in FIG. 10;

FIG. 12 shows this connecting rod in a front view;

FIG. 13 shows this connecting rod in a further side view;

FIG. 14 shows this connecting rod in a section according to the lines XIV-XIV in FIG. 13;

FIG. 15 shows a pick-up unit of this connecting rod in detail in an oblique view;

FIG. 16 shows this connecting rod in a diagonal view in a section analogous to FIG. 14;

FIGS. 17 and 18 show a switching unit of this connecting rod in detail in oblique views from different sides.

FIG. 1 shows a part of an internal combustion engine 1 with variable compression ratio. It comprises a connecting rod 2.

Figure 1:
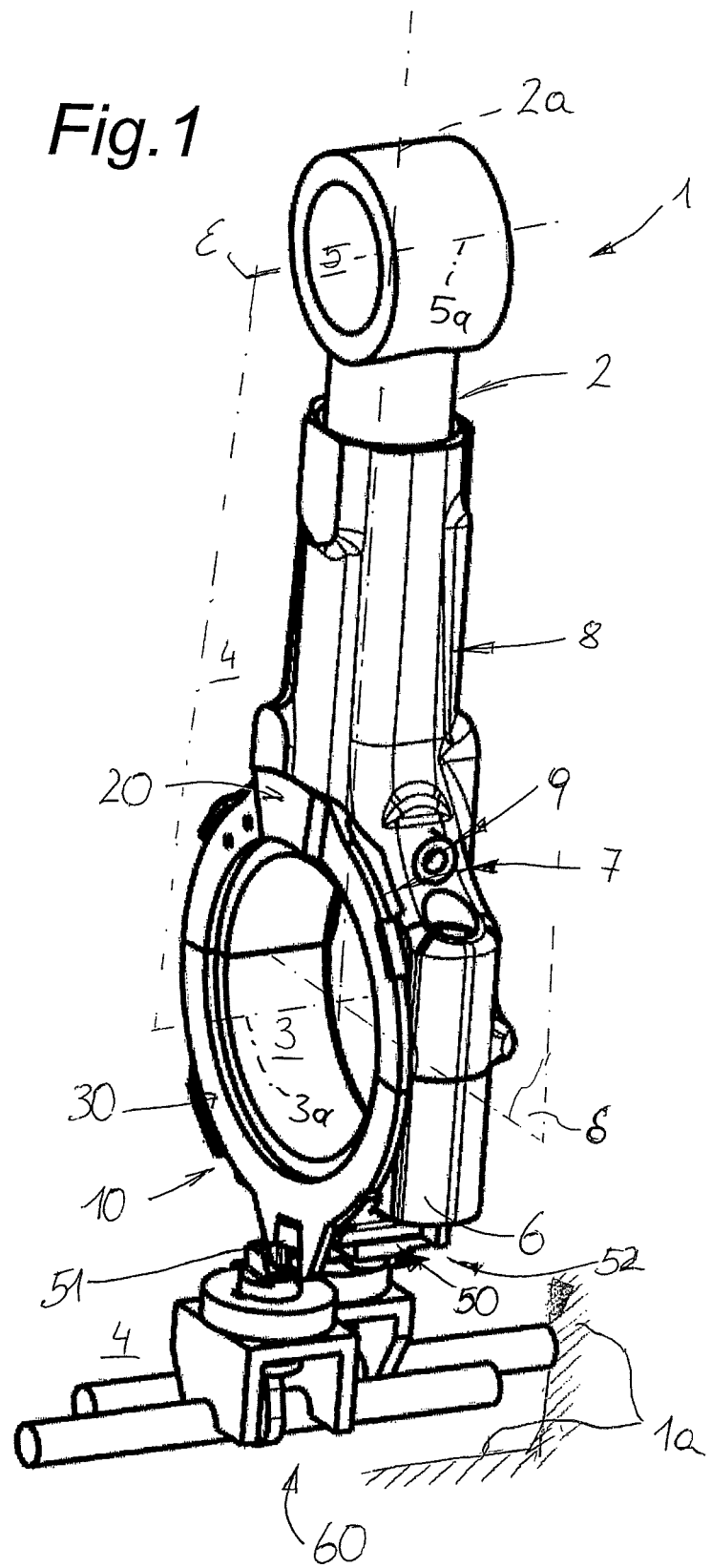
FIG. 1 shows a connecting rod of a reciprocating-piston machine according to the invention in a first embodiment in an oblique view.
Figure 2:
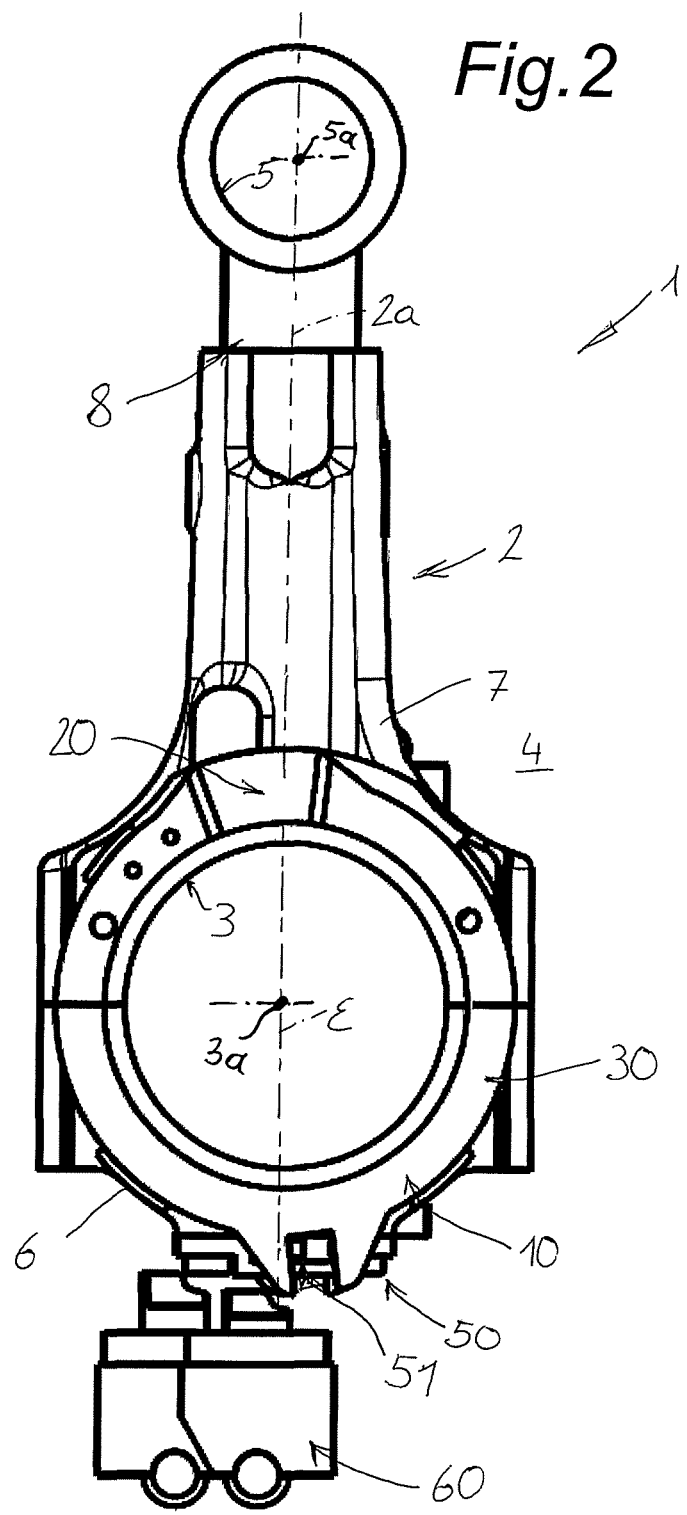
FIG. 2 shows this connecting rod in a side view.

The connecting rod 2 is arranged in a connecting rod bearing 3 in a crank chamber 4 so that it can pivot around a crank pin (not shown). The crank chamber 4 is the cavity around the connecting rod 2 and around a crankshaft, which is bounded by a crankcase 1a, wherein the crankshaft is not shown and the crankcase is only schematically shown below (facing away from a piston which is not shown) the connecting rod 2. The connecting rod 2 has a piston pin bearing 5 next to the connecting rod bearing 3. With a piston pin, the connecting rod 2 is pivotably connected to a piston which is arranged in a cylinder so that it can be moved back and forth. A plane ε passes through the rotational axes 3a, 5a of the cylindrical-jacket-shaped bearing 3, 5. A center plane δ is arranged normal on the rotational axes 3a, 3b of bearings 3, 5. A longitudinal axis 2a of the connecting rod 2 is the intersection line of the middle plane δ and the plane ε.

The illustrated connecting rod 2 is divided into a connecting rod bearing bracket 6 and a connecting rod body 7 in the connecting rod bearing 3. The connecting rod body 7 faces the piston pin bearing 5 on the connecting rod 2 and the connecting rod bearing bracket 6 is arranged facing away from the piston pin bearing 5.

To achieve a variable compression ratio, a length adjusting device 8 is provided in the connecting rod 2. This length adjusting device 8 can be hydraulically or mechanically operated. The connecting rod 2 changes its length along its longitudinal axis 2a by means of the length adjusting device 8.

A switching unit 9 is arranged in the connecting rod body 7 to control the length adjusting device 8. The switching unit 9 is actuated by an actuating mechanism 10. Said mechanism is arranged in the area of the connecting rod bearing 3 and serves to transmit a switching pulse from the connecting rod bearing bracket 6 in the connecting rod body 7 to the switching unit 9. The switching unit 9 is arranged in the embodiments shown in each case in the connecting rod body 7, facing the piston pin bearing 5, in the vicinity of the connecting rod bearing 3.

The actuating mechanism 10 has a pick-up unit 20, a transmission means 30 and a deflection element 50. The deflection element 50 can be contacted with an actuating device 60. The actuating device 60 acts on a first force-application region 51 or on a second force-application region 52 of the deflection element 50.

In the figures the connecting rod 2 is in each case in its lower dead center, which means that the piston assumes its smallest distance from the crankshaft.

The deflection element 50, as shown in FIG. 3, has the first force-application region 51. This is located on a first driver 53, which is fork-shaped. The second force-application region 52 is located on the opposite side of the center plane δ on a second driver 54. The second driver 54 also has a fork shape. Between the fork arms of the drivers 53, 54 there is a deflection lever 55 which can be rotated about a pivot point 55a between a first lever position and a second lever position. The second driver 54 is displaceable.

A first actuating element 61 can engage the first force-application region 51 and a second actuating element 62 can engage the second force-application region 52. The first actuating element 61 and the second actuating element 62 are part of the actuating device 60 shown in FIG. 4. The actuating elements 61, 62 can either be moved along a shaft 63 or rotated around the shaft 63 out of engagement. The actuating elements 61, 62 each have a curved sliding surface 61a, 62a relative to the respective driver 53, 54.

In the embodiment shown, the switching unit has two switching valves 11a, 11b with which a first or second hydraulic line 110a, 110b can be closed or opened in the connecting rod body 7 of connecting rod 2. Using the hydraulic lines 110a, 110b, hydraulic chambers indicated as examples by reference numerals 109 are controlled in the known manner between two telescopically displaceable connecting rod parts, for example. The switching valves 11a, 11b have valve bodies 112a, 112b loaded by valve springs 111a, 111b, which release or close the cross-section of a first or second hydraulic line 110a, 110b. As shown in detail in the figures FIG. 5 and FIG. 6, the pick-up unit 20 has a ramp 21 on the transmission means 30 and two thrust elements 22a, 22b. The thrust elements 22a and 22b, formed for example by cylindrical thrust pins 122a and 122b, are displaceably mounted in guide bores 123a and 123b in the connecting rod 2 and are in touching contact in each case with the valve bodies 112a and 112b. The thrust pins 122a, 122b can be rounded or conically shaped in the area of the end facing the ring slide 31 in order to reduce the actuating forces. As an alternative to two-part embodiments, it is also possible to form valve bodies and thrust pins in one piece. The guide bores 123a, 123b are essentially arranged parallel to the rotational axes 3a, 5a of the bearings 3, 5 of the connecting rod 2.

The reference numerals 124a, 124b relate to non-return valves arranged in the hydraulic lines 110a, 110b which prevent the hydraulic oil from flowing back unintentionally from the hydraulic chambers 109.

In the illustrated embodiment, the transmission means 30 is designed as a ring slide 31. FIG. 7 shows the actuating mechanism 10 in detail. The ramp 21 of the pick-up unit 20 is arranged on the ring slide 31. The ramps 21 of the pick-up unit 20 can be arranged on both sides of a raised part 20a (FIGS. 5, 6) or a recess 20b (FIG. 7). Both with a raised part 20a and with a recess 20b, axial deflections of the thrust elements 22a, 22b and thus actuation of the switching valves 11a, 11b can be achieved by turning the ring slide valve 31 over the ramp 21.

The first driver 53 is arranged on the ring slide 31. The first driver 53 and the ring slide 31 are made in one piece. The driver 53 is located on the ring slide 31 opposite ramp 21, on the side facing away from the connecting rod body 7. A base body 56 of the deflection element 50 is firmly connected to the connecting rod 2. In the embodiment shown, the second driver 54 is displaceably arranged on this base body 56.

As a result of the rotation of the ring slide 31, at least one thrust element 22a or 22b is pushed from the ramp 21 of the pick-up unit 20 by the ring slide 31 in its axial direction (in the direction of the longitudinal axis 22' of the thrust element 22a, 22b) from a first position into a second position. The return takes place by means of the restoring force of the valve springs 111a, 111b.

The invention claimed is:

1. A reciprocating-piston machine having a variable compression ratio with a length adjusting device which is arranged in a connecting rod and which can be activated by a switching unit arranged in the connecting rod, wherein an actuating mechanism is operatively connected to the switching unit in the region of a connecting rod bearing in order to introduce a switching pulse into the connecting rod, wherein the actuating mechanism has a transmission means which is arranged in the region of the connecting rod bearing and the switching unit has at least one switching valve which is arranged in the connecting rod body of the connecting rod and whose valve body, which can be displaced essentially in the direction of the rotational axis of the connecting rod bearing, can be deflected by the transmission means from a first position into a second position, wherein the transmission means is designed as a ring slide and the switching pulse can be transmitted from the connecting rod bearing bracket to the connecting rod body by means of the ring slide.

2. The reciprocating-piston machine according to claim 1, wherein the transmission means has, on a side of the connecting rod facing away from the connecting rod bearing bracket, a pick-up unit for actuating the switching unit for the length adjusting device.

3. The reciprocating-piston machine according to claim 2, wherein the pick-up unit has at least one ramp with which at least one valve body can be deflected.

4. The reciprocating-piston machine according to claim 3, wherein a thrust element which is displaceable through the ramp is arranged between the ramp and at least one valve body.

5. The reciprocating-piston machine according to claim 1, wherein the switching unit has a first switching valve with a first valve body and a second switching valve with a second valve body.

6. The reciprocating-piston machine according to claim 1, wherein the actuating mechanism has a deflection element with at least one first force-application region and at least one second force-application region, and that the first force-application region and the second force-application region can be selectively contacted with at least one actuating device.

7. The reciprocating-piston machine according to claim 6, wherein the deflection element has a deflection lever.

8. The reciprocating-piston machine according to claim 6, wherein the deflection element is arranged on a connecting rod bearing bracket and can be contacted with the actuating device in a lower dead center of the connecting rod.

9. The reciprocating-piston machine according to claim 6, wherein the actuating device is arranged in a crankcase.

10. The reciprocating-piston machine according to claim 1, wherein the transmission means is operatively connected to the deflection element.

11. The reciprocating-piston machine according to claim 6, wherein the deflection element has at least one first driver which is connected to the transmission means.

12. The reciprocating-piston machine according to claim 6, wherein the deflection element has at least one second driver.

13. The reciprocating-piston machine according to claim 6, wherein the actuating device has a first actuating element and a second actuating element,
    wherein the first force-application region is selectively contactable with the first actuating element and the second force-application region is selectively contactable with the second actuating element.

14. The reciprocating-piston machine according to claim 13, wherein the first actuating element and the second actuating element each have a sliding surface for contacting the first force-application region and the second force-application region.

15. The reciprocating-piston machine according to claim 3, wherein at least one valve body can be deflected from a closed position into an open position.

16. The reciprocating-piston machine according to claim 3, wherein at least one valve body can be deflected against the force of a valve spring.

17. The reciprocating-piston machine according to claim 5, wherein the first and second valve bodies are alternately deflectable by at least one ramp of the pick-up unit.

18. The reciprocating-piston machine according to claim 11, wherein at least one first driver is fork-shaped.

19. The reciprocating-piston machine according to claim 12, wherein at least one second driver is fork-shaped.

20. A reciprocating-piston machine having a variable compression ratio with a length adjusting device which is arranged in a connecting rod and which can be activated by a switching unit arranged in the connecting rod,
  wherein an actuating mechanism is operatively connected to the switching unit in the region of a connecting rod bearing in order to introduce a switching pulse into the connecting rod,
  wherein the actuating mechanism has a transmission means which is arranged in the region of the connecting rod bearing and the switching unit has at least one switching valve which is arranged in the connecting rod body of the connecting rod and whose valve body, which can be displaced essentially in the direction of the rotational axis of the connecting rod bearing, can be deflected by the transmission means from a first position into a second position,
  wherein the switching unit has a first switching valve with a first valve body and a second switching valve with a second valve body.

21. A reciprocating-piston machine having a variable compression ratio with a length adjusting device which is arranged in a connecting rod and which can be activated by a switching unit arranged in the connecting rod,
  wherein an actuating mechanism is operatively connected to the switching unit in the region of a connecting rod bearing in order to introduce a switching pulse into the connecting rod,
  wherein the actuating mechanism has a transmission means which is arranged in the region of the connecting rod bearing and the switching unit has at least one switching valve which is arranged in the connecting rod body of the connecting rod and whose valve body, which can be displaced essentially in the direction of the rotational axis of the connecting rod bearing, can be deflected by the transmission means from a first position into a second position,
  wherein the transmission means has, on a side of the connecting rod facing away from the connecting rod bearing bracket, a pick-up unit for actuating the switching unit for the length adjusting device, and
  wherein the pick-up unit has at least one ramp with which at least one valve body can be deflected.

* * * * *